United States Patent [19]
Nomura et al.

[11] Patent Number: 4,717,554
[45] Date of Patent: Jan. 5, 1988

[54] PROCESS FOR ADSORPTION TREATMENT OF DISSOLVED FLUORINE

[75] Inventors: Junji Nomura; Hideaki Imai; Yuzuru Ishibashi; Tokuzo Konishi, all of Fuji, Japan

[73] Assignee: Asahi Kasei Kogyo Kabushiki Kaisha, Osaka, Japan

[21] Appl. No.: 758,805

[22] Filed: Jul. 25, 1985

[30] Foreign Application Priority Data

Feb. 21, 1985 [JP] Japan ................... 60-31625
Feb. 22, 1985 [JP] Japan ................... 60-32853

[51] Int. Cl.$^4$ .................. C01F 17/00; C02F 1/58
[52] U.S. Cl. .................... 423/263; 210/670; 210/683; 210/685; 210/751; 210/753; 210/915
[58] Field of Search ............. 210/915, 685, 753, 749, 210/751, 670, 683; 423/489, 263

[56] References Cited

U.S. PATENT DOCUMENTS

| | | | |
|---|---|---|---|
| 1,851,418 | 3/1982 | Buchner | 423/643 |
| 2,043,705 | 6/1936 | Meinzer | 210/915 |
| 2,139,227 | 12/1938 | Goetz | 210/683 |
| 4,140,771 | 2/1979 | Berard et al. | 423/263 |
| 4,362,626 | 12/1982 | Takeuchi et al. | 210/683 |

FOREIGN PATENT DOCUMENTS

| | | | |
|---|---|---|---|
| 95205 | 4/1975 | Japan | 210/915 |
| 156484 | 9/1984 | Japan | 210/683 |
| 129185 | 7/1985 | Japan | 210/749 |
| 539845 | 2/1977 | U.S.S.R. | 210/915 |

*Primary Examiner*—John Doll
*Assistant Examiner*—Jeffrey Russel
*Attorney, Agent, or Firm*—Birch, Stewart, Kolasch and Birch

[57] ABSTRACT

Fluorine or fluorine compounds dissolved at low concentrations in water are efficiently separated by use of hydrated rare earth oxides or insoluble hydrated rare earth salts, particularly hydrous rare earth fluorides or hydrous rare earth phosphates, as the adsorbent. By bringing fluorine dissolved water of pH 2-7 into contact with said adsorbent, fluorine is adsorbed on the adsorbent, and the adsorbed fluorine can be desorbed by contact with an alkali solution of pH 10 to 14 to regenrate said adsorbent. Also, by addition of a precipitating agent for fluorine to the desorbed solution, fluorine compounds can be separated by precipitation and the filtrate can be reused as the regenerating solution for the adsorbent.

26 Claims, 9 Drawing Figures

Hydrous cerium oxide X ray diffraction

Hydrous cerium oxide IR spectrum

Yttrium hydroxide X-ray diffraction

Yttrium hydroxide IR spectrum

Hydrous yttrium fluoride X-ray diffraction

Hydrous yttrium fluoride IR spectrum

PROCESS FOR ADSORPTION TREATMENT OF DISSOLVED FLUORINE

FIELD OF THE INVENTION

This invention relates to an adsorbent which can remove selectively fluorine and fluorine compounds dissolved at low concentrations in water at high efficiency. Further, the present invention relates to an adsorbent capable of removing by adsorption fluorine and fluorine compounds dissolved in raw water for drinking water or industrial wastewater, said adsorbent being highly operable and economical, since it can desorb by a simple operation and be regenerated and used repeatedly.

In addition, the present invention also relates to a process for treatment of dissolved fluorine and fluorine compounds, more particularly to a closed treatment process which comprises recovering the regenerating solution to be recycled in carrying out adsorption and regeneration by use of said adsorbent.

DESCRIPTION OF THE PRIOR ART

Originally, in the natural world, fluorine occurs in very minute amounts, for example, at about 1.2–1.4 ppm in sea water, ordinarily about 0.1 to 0.3 ppm in river water, and such amounts will cause no trouble in the ecological environment. However, it has been known that fluorine concentration in underground water may sometimes exceed 100 ppm because of discharging of fluorine compounds by volcanic activity.

On the other hand, the amounts of fluorine and fluorine compounds used are increasing in these days and they are widely used in electronic industries for production of semiconductors or washing internally of cathode ray tubes, metal industries such as production of aluminum, chemical industries or ceramic industries. In the wastewater discharged from such industries, fluorine remains as fluorine or compounds such as fluorine compounds, and the fluorine concentration in the wastewater may sometimes reach several hundred ppm.

The water containing such a high concentration of fluorine, which can affect various deleterious influences on human bodies and animals or vegetables as environmental water, must be maintained and managed so as to have as low level of fluorine as possible, and therefore it has been desired to establish highly efficient technique for treatment of such water.

As a process for removing fluorine and fluorine compounds in industrial wastewater, it has generally been practiced to precipitate by separation as calcium fluoride having little solubility in water by use of a calcium salt such as slaked lime, calcium chloride, etc. However, calcium fluoride also has a solubility in water, and the fluorine concentration cannot be made 10 ppm or less even by an ideal treatment. Also, fluorine tends greatly to form complex ions with silicon, iron, aluminum in wastewater, and the calcium salts thereof have greater solubilities and hence it is very difficult to remove fluorine to low concentration by precipitation separation.

On the other hand, as a process for removing a minute amount of fluorine dissolved in water at less than 10 ppm, it has been practiced in the prior art to treat water by adsorption with an activated alumina or with the use of a combination of an ion-exchange resin and an activated alumina. However, in the activated aluminum adsorption process, the amount of fluorine adsorbed on the activated alumina is small, and also adsorption is affected by the co-existing ions such as carbonate ions, etc., whereby no expected removing effect cannot disadvantageously be obtained. In this connection, there is an attempt to remove fluorine by treating the solution, from which other co-existing ions have been removed by adsorption with an ion-exchange resin, with an activated alumina. However, in this case, harmless ions are also removed excessively to make the quality of water undesirable for drinking water, and also there is involved the problem of high cost in such treatment. Also, as an advanced treatment process of wastewater containing both fluorine and fluorine compounds, it has been proposed to subject the wastewater to the adsorption treatment by use of an anion exchange resin, after enhancement of selective adsorbability by converting the fluorine to fluorine compounds by the reaction with silicon (Japanese Laid-open Patent Publication No. 8582/1983) or iron, aluminum or zirconium (Japanese Laid-open Patent Publication No. 64181/1983). However, this process involves the problems such that the treatment steps become more complicated or that the conditions for high degree of treatment to a fluoride ion concentration of 1 ppm or less can be set with difficulty, because fluorine remains in wastewater due to the dissociation constant possessed by fluorine compounds.

As described above, under the present situation, neither the adsorbent capable of removing fluorine and fluorine compounds contained in minute amounts in solutions nor its treatment technique has satisfactorily been established.

SUMMARY OF THE INVENTION

An object of the present invention is to provide an adsorbent capable of removing fluorine and fluorine compounds dissolved at low concentrations, particularly an adsorbent capable of removing selectively and efficiently minute fluorine and fluorine compounds coexisting with various cations and anions in solution.

Another object of the present invention is to provide an economical adsorbent which can adsorb fluorine and fluorine compounds dissolved in solutions and also allows repeated use by efficient desorbing regeneration.

Still another object of the present invention is to provide an economical process for treatment of dissolved fluorine comprising the step of separating by adsorption of fluorine and fluorine compounds dissolved in solutions, the step of regenerating the asdsorbent, the step of recovering of fluorine by precipitation and the step of recovering the regenerated solution.

A further object of the present invention is to provide a process for producing the adsorbent suitable for adsorption of dissolved fluorine and fluorine compounds.

The present invention provides an adsorbent capable of removing efficiently fluorine and fluorine compounds dissolved at low concentrations and an economical process for treatment by use of said adsorbent.

More specifically, the adsorbent of the present invention comprises hydrated rare earth oxides or insoluble hydrated rare earth salts of at least one metal selected from the group consisting of rare earth elements.

The adsorbent of the present invention can adsorb fluorine and fluorine compounds selectively and at high efficiency by bringing it into contact with a fluorine dissolved in water with pH ranging from 2 to 7, and the adsorbed fluorine on said adsorbent can readily be desorbed to regenerate for reuse by contacting with an aqueous alkali solution of pH 10 or higher.

Further, the treatment process of the present invention comprises carrying out adsorption treatment by bringing said adsorbent into contact with a fluorine dissolved in water, subsequently into contact with an aqueous alkali solution to regenerate the adsorbent, removing by separation as fluorine compounds by adding a precipitating agent for fluorine to said desorbed solution and using the filtrate as the aqueous alkali solution for regeneration of said adsorbent.

DETAILED DESCRIPTION OF THE INVENTION

Figure 1:
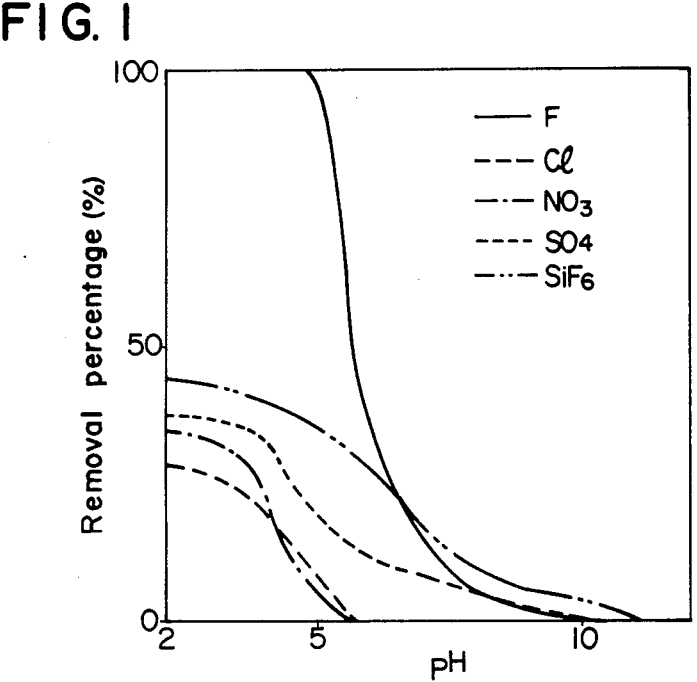
FIG. 1 shows the relationships between the removal percentage of fluoride ions, hexafluorosilicic ions, chloride ions, nitrate ions and sulfate ions dissolved in the aqueous solution by the hydrous cerium oxide of the present invention and pH.

The adsorbent of the present invention comprises hydrated rare earth oxides or insoluble hydrated rare earth salts of at least one metal selected from the group of rare earth elements. The adsorbent of the present invention can be brought into contact with a fluorine dissolved in water with a pH ranging from 2 to 7 to adsorb fluorine and fluorine compounds selectively and at a high efficiency, and the adsorbed fluorine on said adsorbent can readily be desorbed by contact with an aqueous alkalli solution of pH 10 to 14 to regenerate the adsorbent for reuse.

The rare earth metal elements of the present invention include Sc, Y, La, Ce, Pr, Nd, Pm, Sm, Eu, Gd, Tb, Dy, Ho, Er, Tm, Yb and Lu. Of these rare earth metals, Y, La, Ce, Nd and Sm are preferred, and particularly Ce(IV) is most preferred for great adsorption capacity as well as negligible extent of small solubility in water.

The hydrated rare earth oxides and insoluble hydrated rare earth salts may include typically hydrous oxides, hydroxides, and hydrates of phosphates, pyrophosphates, carbonates, borates, silicates and chromates. The insoluble hydrated rare earth salts as herein mentioned refer to those having a solubility of 10 mg/liter or less in pure water. Of these insoluble hydrated rare earth salts, hydrates of rare earth fluorides and rare earth phosphates are particularly preferred for excellent adsorption capacity. These hydrated rare earth oxides and insoluble hydrated rare earth salts may be used either singly or as a mixture of two or more compounds.

In the following, a process for production of the adsorbent of the present invention is exemplified, but the present invention is not limited by this process.

Said hydrated rare earth oxide of the present invention can be obtained easily as the precipitate by, for example, adding an alkali solution into an aqueous solution of a salt such as said metal chloride, sulfate, nitrate, etc. and controlling the pH of the above aqueous salt solution. In controlling the pH, by selecting the metal and its salt employed, the solution thereof, the alkali employed and its solution, and the precipitate forming conditions such as the method for mixing the aqueous metal salt solution with the alkali solution and the speed of mixing, etc., hydrous oxides or hydroxides can be formed.

Of insoluble hydrated rare earth salts, hydrous rare earth fluoride can be obtained by the reaction of hydrofluoric acid with the hydrated oxide prepared by the above method or by the reaction of hydrofluoric acid or an aqueous readily soluble fluoride with the aqueous solution of said metal salt similarly as said hydrated rare earth oxide to prepare said hydrous rare earth fluoride, followed by the reaction of an aqueous alkali solution such as aqueous sodium hydroxide, etc. with said hydrous rare earth fluoride.

Other insoluble hydrated rare earth salts can be obtained as the precipitate by the reaction of the rare earth solution with the aqueous solution of the corresponding soluble salt.

In preparation of said hydrated rare earth oxides and said insoluble hydrated rare earth salts according to the above method, various kinds of metal ions may be permitted to co-exist to form composite hydrated rare earth oxides and composite insoluble hydrated metal salts. Examples of such metal which can co-exist may include Al, Cr, Co, Ga, Fe, Mn, Ni, Ti, V, Sn, Zr, Hf, Ge, Nb, Ta, Th, etc. These co-existing metal elements may be present in an amount of 40 mol % or less, more preferably 20 mol % or less, based on the metal element of the present invention.

Also, the cations and anions to be used in the preparation as described above may also exist as a part of structure of the hydrated rare earth oxide or the insoluble hydrated rare earth salts of the present invention. These cations and anions which can co-exist may include, for example, $NH_4$, Na, K, Ca, Mg, Al, $SO_4$, $NO_3$, F, Cl, $PO_4$, $P_2O_7$, $CrO_4$, $BO_3$, $SiO_3$, $CO_3$, etc.

The structural characteristic of said hydrated rare earth metal oxide and said insoluble hydrated rare earth salts prepared by the above method is described below.

The structure of a hydrated rare earth oxide and an insoluble hydrated rare earth salts is not clear, but its chemical formula may be estimated as follows.

That is, concerning hydrated rare earth oxides, the chemical formulae for trivalent and tetravalent rare earth elements may be $Ln(OH)_3 \cdot xH_2O$ and $Ln(OH)_4 \cdot xH_2O$ or $[Ln_2O_a(OH)_{6-2a} \cdot xH_2O]n$ asnd $[LnO_b(OH)_{4-2b} \cdot xH_2O]n$, respectively. On the other hand, the insoluble hydrated rare earth salts may considered to be the above hydrated rare earth oxides, in which a part of all of OH groups are substituted with anions such as F, $PO_4$, $P_2O_7$, $CO_3$, $BO_3$, $SiO_3$, $CrO_3$, etc. (here, a part of Ln may be substituted with cations other than rare earth elements as mentioned above, and a part of (OH) group may be substituted with anions as mentioned above). In these formulae, Ln represents a rare earth element, and a is an integer of 0 to 3, b and integer of 0 to 2 and x and n are positive numbers.

Of hydrated rare earth oxides, hydrous oxides refer to those which exhibit the same diffraction patterns as the corresponding metal oxides in X-ray diffraction, but have broad diffraction line widths due to poor crystallinity, having no specific thermal transition point and generating gradually thermal weight reduction with temperature elevation until becoming finally oxides with good crystallinity, while having a thermal weight reduction of 5 to 30 wt. %. In IR absorption spectrum, a broad absorption band based on the stretching vibration of hydroxyl group at around 3400 $cm^{-1}$ and 2 to 3 absorption bands based on deformation vibrations of hydroxyl group at 1700–1300 $cm^{-1}$ are exhibited.

On the other hand, hydroxides refer to those which exhibit diffraction pattern of corresponding metal hydroxides in X-ray diffraction and thermally transitioned to oxides at specific temperatures. In IR-absorption spectrum, sharp absorption bands at 3500–3700 $cm^{-1}$ inherent in metal hydroxides based on stretching vibration of hydroxyl group, broad absorption band at around 3400 $cm^{-1}$ and 2 to 3 absorption bands at 1700–1300 $cm^{-1}$ based on deformation vibration of hydroxyl group are exhibited.

Of insoluble hydrated rare earth salts, hydrous rare earth fluorides exhibit the same patterns as the corresponding rare earth fluorides or rare earth oxyfluorides in the X-ray diffraction, but have broad diffraction line widths due to poor crystallinity. Thermally, they have no specific transition point, and are converted to rare earth fluorides or rare earth oxyfluorides at higher temperature, for example, up to 500° C., and the thermal weight reduction thereby is 2 to 20 wt. %. In IR absorption spectrum, a broad absorption bands based on the stretching vibration of the hydroxyl group at around 3400 $cm^{-1}$ and 2 to 3 absorption bands based on deformation vibrations of the hydroxyl group at 1700–1300 $cm^{-1}$ are exhibited.

As described above, the hydrated rare earth oxide and the hydrous rare earth fluoride of the present invention have respective inherent characteristics in X-ray diffraction, IR absorption spectrum and thermal properties, and their common characteristic is to have absorption bands at around 1500 $cm^{-1}$ and 1350 $cm^{-1}$, and the structure having said absorption bands is very important in exhibiting the effect of the present invention.

On the other hand, as for said hydrous rare earth phosphate, no specific diffraction line is exhibited in X-ray diffraction but only moderate scattered line is exhibited, having no thermal specific transition point, with the thermal reduction weight being 5 to 40 wt. %. In IR absorption spsectrum, a broad absorption band based on the stretching vibration of hydroxyl group at around 3400 $cm^{-1}$, 2 to 3 absorption bands based on deformation vibration of hydroxyl group at 1700–1300 $cm^{-1}$ and an absorption band based on phosphoric acid group at 1000 to 1100 $cm^{-1}$ are exhibited.

The thermal weight reduction as herein mentioned refers to the percentage reduction based on the original weight when a sample is heated at a rate of 10° C./min. from room temperature up to 800° C. in the case of a hydrated rare earth oxide, or up to 500 ° C. in the case of a hydrous rare earth fluoride fluoride or a hydrous rare earth phosphate.

The adsorbent in the present invention is a cake obtained by filtration of said hydrated rare earth oxide or said insoluble hydrated rare earth salts according the preparation method as described above, etc., or its dried powder and a molded product by molding these into any desired shape such as granules, filaments, strands, bands, plates, etc. by an appropriate method such as carrying on a porous carrier, etc. Said molded product is very useful in enhancing practical absorbing operation.

As the material to be used as the carrier, various inorganic and organic materials capable of exhibiting the effect of the present invention can be used, but various organic polymeric materials are preferred in aspects of carrying workability, strength of carrier and chemical resistance.

Organic polymeric materials may include phenol resin, urea resin, melamine resin, polyester resin, diallyl phthalate resin, xylene resin, alkylbenzene resin, epoxy resin, epoxy acrylate resin, silicon resin, urethane resin, fluorine resin, vinyl chloride resin, vinylidene chloride resin, polyethylene, chlorinated polyolefin, polypropylene, polystyrene, ABS resin, polyamide, methacrylic resin, polyacetal, polycarbonate, cellulose resin, polyvinyl alcohol, polyimide, polysulfone, polyacrylonitrile, etc., and copolymers as mentioned above. Particularly preferable materials are those having appropriate water resistance, chemical resistance and great hydrophilic property, which are capable of forming porous structures, such as polyamide, cellulose resin, polysulfone, polyacrylonitrile, ethylene-vinyl alcohol copolymer, etc.

Various known methods may be applicable for carrying the adsorbent on the above organic polymeric material. For example, in a solution having an appropriate polymer dissolved therein, particles of said hydrated rare earth oxide or insoluble hydrated rare earth salt may be suspended and formed into granules, filaments, strands or bands. Alternatively, an appropriate monomer for a polymer is polymerized by emulsion or suspension polymerization in the presence of said hydrated rare earth oxide or insoluble hydrated rare earth salt to be formed into granules. Further, it is also possible to mix and mold an appropriate polymer with said hydrated rare earth oxide or insoluble hydrated rare earth salt and various agents to be extracted, and extracting said agents with an appropriate solvent. In any of these cases, it is necessary to form a structure in which said hydrated rare earth oxide or insoluble hydrated rare earth salt is sufficiently carried on the molded product to be leaked away with difficulty, and any method may be used, provided that such an object can be accomplished.

Of these methods, a particularly preferred method is to dissolve a hydrophilic polymer such as polyamide, cellulose resin, polysulfone, polyacrylonitrile, ethylene-vinyl alcohol copolymer, etc. in an appropriate solvent, suspend said hydrated rare earth oxide or insoluble hydrated rare earth salt in the resultant solution and coagulating the suspension into beads in water bath.

The beads obtained by this method have a porous structure, sufficient adsorption rate and physical strength and suitable for carrying out adsorption and desorption operations according to fixed-bed or fluidized-bed engineering process.

Particularly, the amount of the polymer employed may be 5 to 50 wt. %, preferably 10 to 30 wt. %, of said hydrated rare earth oxide or insoluble hydrated rare earth salt. At a level lower than 5 wt. %, no sufficient carrying effect can be exhibited and the strength is also insufficient, while an amount over 50 wt. % will markedly lower the adsorption rate.

The size and the void volume of the said beads have influences on the adsorbing action, particularly adsorption rate, of the adsorbent of the present invention. The beads size may preferably be 0.1 to 5 mm on an average, and the void volume 0.5 to 0.85.

The average particle size refers to the weight average particle size shown by the 50% accumulated value in the accumualated distribution curve determined by screening with several kinds of mesh.

The void volume as mentioned in the present invention refers to a value of the change in volume $(V_I-V_0)$ from the apparent volume $(V_I)$ under dry state of said particles to compressed volume $(V_0)$ during compression relative to said apparent volume, namely represented by $(V_I-V_0)/V_I$. Here, the apparent volume $(V_I)$ is the volume of a certain weight of beads measured by the mercury picnometer method, while the compressed volume $(V_0)$ is the volume of the same weight of sample by compression molding at 100° C. under a pressure of 50 kg/cm². If the void volume is less than 0.5, the adsorption rate will be too slow, while a void volume over 0.85 will make the strength insufficient.

Also, the properties and the surface conditions of the particles of said hydrated rare earth oxide and said insoluble hydrated rare earth salt are very important in exhibiting the effect of the present invention, and it is preferable to control the structural water or amount of water attached and particle sizes and agglomeration degree of the particles, so that the particle size may be as small as possible, namely a primary particle size of 0.01μ to 1μ as average particle size, particularly preferably 0.01 to 0.5 μm, being also fine particles with a low degree of agglomeration with sizes of about 0.05 to 10μ.

The method for adsorbing fluorine and fluorine compounds onto said adsorbent may be any method which can bring said hydrated rare earth oxide or said insoluble hydrated rare earth salt into contact with water containing fluorine and fluorine compounds dissolved therein. For example, there may effectively employed the method in which a cake, powder or molded product thereof as described above of said hydrated rare earth oxide or said insoluble hydrated rare earth salt is added and dispersed in said water, or the method in which said water is passed through a column filled with said molded product or powder.

The hydrated rare earth oxide and insoluble hydrated rare earth salt, which is the fluorine adsorbent of the present invention, has also excellent adsorption capacity even when fluorine may exist in the form of fluorine compounds, and can remove fluorine comprehensively from the fluorine containing water in which both of fluoride ions and fluorine compounds co-exist. The fluorine compounds existing in water may include hexafluorosilicic ion, fluoroboric ion, hexafluoroaluminum ion, hexafluoroferric ion, hexafluorotitanium ion, hexafluorozironium ion, etc. and these may be dissolved either singly or as a mixture of two or more kinds in water. Particularly, fluorine exists frequently as hexafluorosilicic ion, and it can excellently be adsorbed by use of the hydrous cerium oxide of the present invention at pH 7 or lower.

The mechanism in which the hydrated rare earth oxide and insoluble hydrated rare earth of the adsorbent in the present invention adsorbs fluorine is due to anion exchange between the hydroxyl groups existing on the fluorine adsorbent and the dissolved fluoride or fluorine compounds. The hydroxyl groups existing on said fluorine adsorbent are rich in activity and undergo an exchange with various dissolved anions such as fluoride ions, fluorine compounds, chloride ions, nitrate ions, sulfate ions, etc. when the pH of the aqueous solution is low, while they are retained as hydroxyl groups when the pH is high. That is, when the pH of the aqueous solution in which various anions are dissolved is low, various anions are fixed on said adsorbent, while said anions fixed on said adsorbent are dissolved out into the aqueous solution when the pH is high.

For example, when using the hydrous cerium oxide of the present invention, the relationship between the adsorption capacity of said adsorbent for fluoride ions, hexafluorosilicic acid, chloride ions, nitrate ions and sulfate ions and the pH of the solution during adsorption shows that the adsorption capacity is greater on the acidic side for each ion, as shown in FIG. 1. Particularly, in the case of fluoride ions, the adsorption amount is abruptly increased at pH 7 or lower of the solution, but in the case of other ions such as chloride ions, no abrupt increase in adsorption amount is observed unless at pH 4 or lower.

Accordingly, when fluoride ions co-exist with other ions such as chloride ions, fluoride ions can selectively be adsorbed at pH 2–7 of the solution. Besides, the adsorption capacity for said ions is markedly greater as compared with other ions. In adsorption of fluoride ions by said adsorbent, the preferable pH of the solution is 2 to 7. At a pH lower than 2, the solubility of said adsorbent is too high, while adsorption capacity is too small at a pH higher than 7.

The fluorine adsorbent of the present invention is very excellent in fluoride ion selectivity. More specifically, in a solution containing chloride ions, nitrate ions and sulfate ions at the same concentration as the fluoride ions, the selectivity relative to other anions than fluoride ions, when said aqueous solution has pH 5 during adsorption equilibrium, is as high as $1\times 10^2$ to $1\times 10^3$ for selectivity coefficient of fluoride ions relative to chloride ions (F/Cl), $2\times 10^2$ to $5\times 10^3$ for selectivity coefficient of fluoride ions relative to nitrate ions (F/NO$_3$) and $3\times 10$ to $2\times 10^2$ for selectivity coefficient of fluoride ions relative to sulfate ions (F/SO$_4$).

The selectivity coefficient as mentioned in the present invention as represented relative to, for example, chloride ions is represented by the following formula:

$$K(F/Cl) = \frac{[\text{Total fluorine conc. in adsorbent (meq/g-adsorbent)}] \times [\text{Chloride ion conc. in aqueous solution (mmol/liter)}]}{[\text{Total fluorine conc. in aqueous solution (mmol/liter)}] \times [\text{Chloride ion conc. in adsorbent (meq/g-adsorbent)}]} \quad \text{Formula (I)}$$

The saturated adsorption amount per unit weight of the fluorine adsorbent of the present invention is correlated with the fluoride ion concentration in the solution. For example, in the case of hydrous cerium oxide, if the pH of the aqueous solution during adsorption equilibrium is 5, the saturated adsorption amounts of fluoride on said fluoride ion adsorbent are 1.0 mmol/g-adsorbent, 2.0 mmol/g-adsorbent and 3.8 mmol/g-adsorbent at the fluoride ion concentrations in the aqueous solution of 0.01 mmol/liter, 0.1 mmol/liter and 1.0 mmol/liter, respectively. Accordingly, when removing by adsorption fluoride ions by use of said fluorine adsorbent, a suitable mixing ratio of said fluorine adsorbent and the fluoride ion containing water can be set depending on the initial concentration of fluoride ions and the target concentration thereof. For example, in the case when the hydrous cerium oxide having the above adsorption capacity is employed and the initial concentration of fluoride ions is 2 mmol/liter (38 ppm) and the fluoride ion concentration of the fluoride ion containing water is aimed at 0.8 mmol/liter (15 ppm), one gram of said adsorbent may be mixed with 2.8 liter of said aqueous solution and said mixture may be adjusted to pH 5.

Figure 2:
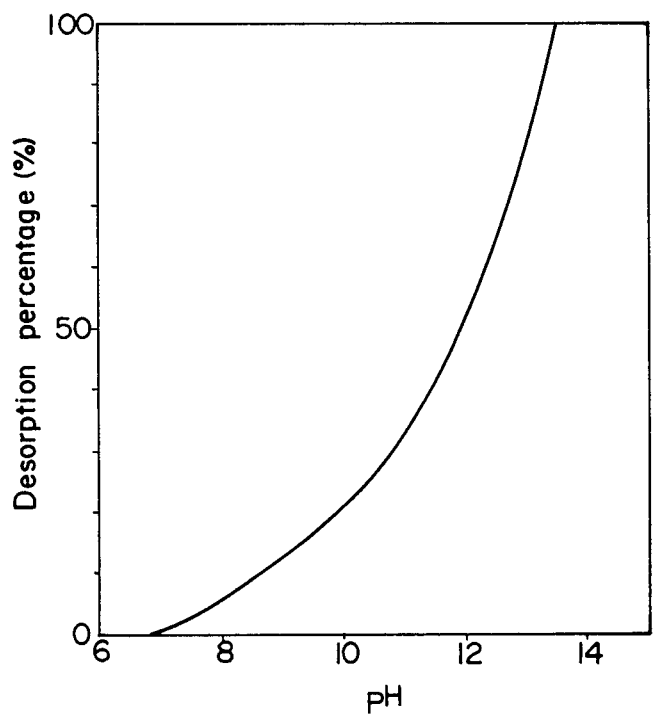
FIG. 2 shows the relationship between pH of the solution and the desorption percentage when desorbing the hydrousyttrium fluoride having fluorine adsorbed thereon.

The adsorbent having adsorbed fluoride ions thereon of the present invention can also eliminate fluoride ions through contact with an alkali solution to be provided repeatedly for adsorption operations. In the above desorption operation, the amount of fluoride ions adsorbed on said adsorbent, the desorption percentage and fluorine ion concentration in the desorbing solution depend on the pH of the desorbing solution to be contacted, the mixing ratio of the adsorbent and the kind of desorbing solution and the solution temperature. For example, when employing the hydrous yttrium fluoride of the present invention, the desorption percentage will be increased abruptly with the contact pH of the desorbing solution as shown in the relationship between the contact pH of the desorbing solution and the desorption percentage shown in FIG. 2. Theerefore, the contact pH of the desorbing solution in the desorption operation may preferably be 10 or higher, more preferably 12 or higher. At a pH lower than 10, the desorption percentage is very low.

In the above desorption operation, for the aqueous alkali solution, inorganic alkalis such as sodium hydroxide, potassium hydroxide, ammonium hydroxide, and organic amines may be used. Sodium hydroxide and potassium hydroxide are particularly preferred for great desorption percentage. The alkali solution may have a concentration of 0.01 mol/liter or higher, preferably 0.05 mol/liter or higher.

As the method for desorbing fluorine and fluorine compounds fixed on the adsorbent of the present invention, there may be employed any method which can bring said adsorbent into contact with an aqueous alkali solution, namely the method similarly as in the adsorption method as described above.

In the following, the process for treatment of water containing dissolved fluorine and fluorine compounds by use of said adsorbent is described for the respective steps. The treatment process included in the present invention comprises the four kinds of the steps shown below. In these steps, only the step (1) is essential and the step (2), the steps (2)+(3), or the steps (2)+(3)+(4) may be combined with the step (1), if desired:

(1) the adsorption step of bringing water containing fluorine and fluorine compounds into contact with said adsorbent to separate fluorine by adsorption;

(2) the desorption and regeneration step by contacting the resultant adsorbent with a regenerating solution;

(3) the fluorine recovery step which recovers fluorine from the desorbed solution by precipitation and separates the filtrate therefrom; and (4) the regenerating solution recovery step in which the filtrate is adjusted for the regenerating solution in the step (2).

The adsorption step (1) in the present invention comprises adjusting the pH of the water containing fluorine and fluorine compounds dissolved therein to the suitable condition for adsorption of pH 2 to 7, and then bring the water into contact with said adsorbent to adsorb fluorine and fluorine compounds adsorbed thereon.

The temperature in the above adsorption operation has an influence on the adsorption rate, and heating may effectively be conducted. However, even at normal temperature, the adsorbent has a practically sufficient adsorption rate, and adsorption may be possible at 5 to 90° C., practically preferably at 20 to 60° C. The contact time, which may depend on the method of contact and the adsorbent employed, may be generally about one minute to 3 days before saturation of the adsorbed amount, but practically one to 60 minutes. These conditions of temperature and time may also be applicable for the desorption and regeneration operation as hereinafter described.

The next desorption and regeneration step is carried out by bringing the adsorbent having fluorine and fluorine compounds adsorbed thereon into contact with an alkali solution. The desorption percentage depends on the concentration of fluorine and fluorine compounds adsorbed on the adsorbent, the pH and the temperature of the alkali solution. Particularly, the influence by the pH of the alkali solution is great, and desorption may be possible at pH 10 or higher, preferably 12 or higher, more preferably 13 or higher.

In the above desorption operation, for the aqueous aslkali solution, inorganic alkalis such as sodium hydroxide, potassium hydroxide, ammonium hydroxide, etc. organic amines may be used. Particularly, sodium hydroxide and potasaium hydroxide are preferred for great desorption efficiency.

The amount of the alkali required for desorption of fluorine and fluorine compounds may be about one equivalent or more, preferably 1.3 equivalent or more, of the fluorine atoms to accomplish 100% adsorption percentage. Accordingly, the fluorine concentration in the eluate can be made greater as the pH of the alkali solution is greater whereby fluorine compounds and the alkali solution can more easily be recovered from the eluate.

When these alkali solutions are brought into contact with the adsorbent having fluorine and fluorine compounds adsorbed thereon, the fluorine and fluorine compounds will be desorbed through the ion exchange reaction, whereby the eluate after desorption will be neutralized to lower pH In the present invention, according to further the fluorine recovery step (3) and the regenerating solution recovery step (4), by removing fluorine as the precipitates of insoluble fluoride salts, fluorine can be separated by precipitation as the solid and a filtrate can be provided for reuse as the regenerating solution. For removing fluorine by separation as the precipitates of fluoride salts, there may be employed known precipitating agents such as chlorides, oxides, hydroxides, of calcium, magnesium, aluminum, etc. in an equivalent amount, preferably 1 to 4-fold equivalent, of fluorine. If the amount added is less than equivalent, the removal efficiency to be precipitated as fluoride will be lowered, while an amount over 4-fold equivalent will be uneconomical, since the removal efficiency cannot substantially be changed. The pH of the eluate in removing by separation may preferably 6 or higher, and further pH 12 or higher, preferably 13 or higher in the case of recovering the alkali solution from the eluate as the regenerating solution as hereinafter described. If the pH during precipitation treatment is smaller than 6, the solubility of said metal compound becomes greater to lower the precipitation separation efficiency and, if the pH during recovery of the alkali solution is lower than 12, the efficiency of the alkali recovery will undesirably be lowered. The most suitable precipitating agent is a calcium compound and, when fluorine compounds are removed by precipitation as calcium compounds, other than calcium ions, aluminum sulfate or phosphates may also be permitted to co-exist, whereby the precipitation separation efficiency of the fluorine compounds in the eluate can be enhanced.

Here, as the conditions for the precipitation separation, the reaction time may be 10 minutes or longer, and the reaction temperature may be at around normal temperature to effect sufficiently rapid reaction, and no heating is particularly required. Also, for enhancing the precipitation separation, a known polymeric agglomerating agent may also preferably be added.

In the supernatant or the filtrate separated by precipitation, fluorine and fluorine compounds may be sometimes contained at a fluorine concentration of about 8 ppm or even to some ten ppm. Therefore, when its amount is small, it can be recycled to the adsorption step or diluted to be discharged as wastewater, or alternatively used as the water for make-up of the alkali solution for desorption. However, the most preferable method is to recover it as the alkali solution for desorption and regeneration of the adsorbent for reutilization.

The regenerating solution recovery step (4) may be conducted by adding calcium hydroxide in an amount of 1 to 4-fold equivalent of the fluorine in the eluate, while maintaining the pH in the eluate as described above at 12 or higher, preferably 13 or higher, thereby separating the supernatant or the filtrate from the fluorine compounds by precipitation for use as the regenerating solution of the subsequent adsorbent. Excessive calcium hydroxide may be used in an amount corresponding to its solubility as the regenerating solution. Further, when an alkali, solution with a concentration of pH 13 or is acquired an alkali such as sodium hydroxide or potassium hydroxide is added to said filtrate to adjust pH to a desired value. These inorganic alkalis for maintaining the eluate at 13 or higher can be recovered in almost all the amounts, and therefore in the case of reutilization after the second time, a small amount thereof may be supplemented to adjust the pH of the regenerating solution to a desired value to an economical advantage.

For example, when sodium hydroxide is used in the regenerating solution and fluorine exists as sodium fluoride, a highly concentrated alkali solution can be recovered following the following reaction:

$$2NaF + Ca(OH)_2 \rightarrow 2NaOH + CaF_2 \downarrow$$

This reaction can proceed efficiently at pH 12 or higher, preferably at pH 13 or higher.

The alkali solution recovered here contains fluorine corresponding to the solubility of the fluoride, generally about 20 ppm of fluorine concentration, but it has no deleterious influence on the efficiency of the desorption regeneration, since the fluorine concentration in the eluate can be made as high as some thousand ppm. Thus, the treatment process of the present invention is characterized by separating efficiently the fluorine and fluorine compounds dissolved at low concentrations and concentrating to higher concentration by elution of the adsorbed fluorine with an alkali solution to take out calcium compounds out of the system, which calcium compounds may also be used as the starting material for production of fluorine.

Also, the alkali solution recovered here contains calcium ions corresponding to the solubility and therefore, when brought into contact as such with the adsorbent having fluorine adsorbed thereon, precipitation of metal fluorides may sometimes be formed. Accordingly, it is effective to remove previously calcium ions. For this purpose, conventional methods may be applicable, but a preferable method is to bring the alkali solution into contact with a cation exchanger. Further, since the adsorbent of the present invention is an amphoteric ion exchanger capable of adsorbing also calcium ions in an alkaline region, the same adsorbent used in fluorine adsorption can also effectively be used for adsorption removal of calcium ions in the regenerating solution.

The adsorbent subjected to desorbent regeneration through contact with an alkali solution should desirably be adjusted to pH suitable for the adsorption operation prior to the adsorption operation. The alkali component adhering on the adsorbent can be removed by washing the adsorbent with water or dilute acid, and it is generally effective to contact the adsorbent with an acid such as hydrochloric acid, sulfuric acid or nitric acid of 0.001N to 1N.

Figure 6:
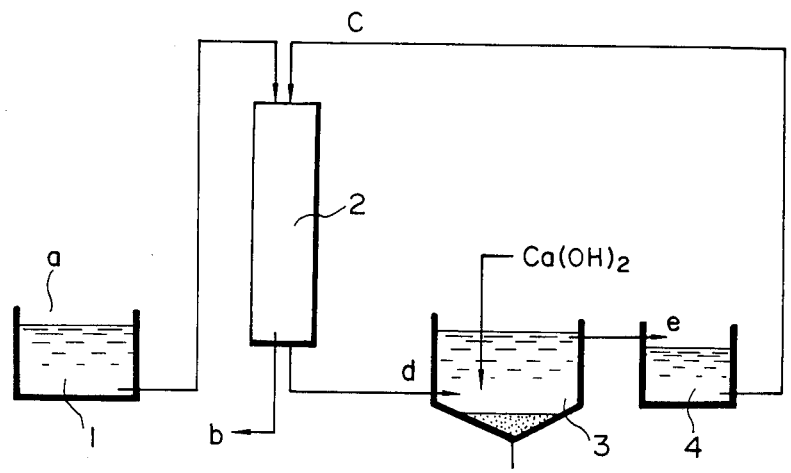
FIG. 6 shows an example of the fluorine treatment process of the present invention.

Referring now to the drawing, an embodiment of the process of the present invention is to be described. FIG. 6 shows an embodiment for practicing the process of the present invention, by which the present process is not limited. In FIG. 6, the fluorine containing solution a is adjusted at pH 5 in the reservoir 1, then delivered to the adsorption column 2 filled with said adsorbents, wherein fluorine is adsorbed to give treated water b. When the fluorine concentration reaches a certain set value (breakthrough point), the adsorption step is tranferred to the desorption regeneration step, and an alkali solution c of pH 10 or higher is delivered to the adsorption column 2 to elute the fluorine adsorbed, thereby forming an eluate d. The pH of the eluate d is 6 to 7 and the fluorine concentration becomes 1,000 to 5,000 ppm or more higher depending on the concentration of the said alkali solution. The eluate d is delivered to the precipitation tank 3, where calcium hydroxide is added thereto to form precipitates of calcium fluoride. The precipitates formed are taken out as calcium fluoride. The supernatant e in the precipitation tank is delivered to the regenerating tank 4, where it is adjusted to pH 10 or higher for reuse as the regenerating solution c.

In the present invention, when it is desired to perform treatment of the fluorine containing waste liquor continuously, two or three or more of fluorine adsorbing columns may be used and running can be operated by switching the adsorption and the desorption regeneration steps. In some cases, the process of the present invention can be practiced even by the multi-stage fluidized bed process, the moving bed process or the batch adsorption process.

The present invention is described in more detail by referring to the following Examples.

The adsorption amount, the removal percentage and the desorption percentage in the specification were determined according to the formulae shown below:

Adsorption amount (mmol/g-adsorbent) =

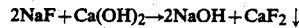

-continued

Removal percentage (%) =

$$1 - \frac{\text{Conc. after adsorption (mmol/liter)}}{\text{Initial conc. (mmol/liter)}} \times 100$$

Desorption percentage (%) =

$$\frac{\text{Liquid amount (liter)} \times \text{conc. (mmol/liter)}}{\text{Amount of adsorbent (g)} \times \text{adsorption amount(mmol/g)}} \times 100$$

EXAMPLE 1

Figure 3A:
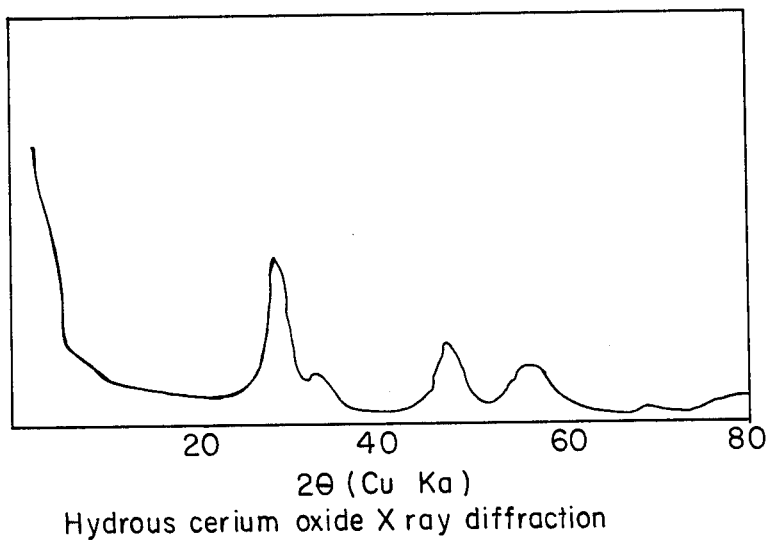
FIG. 3a is a X-ray diffraction spectrum of the hydrous cerium oxide of the present invention.
Figure 3B:
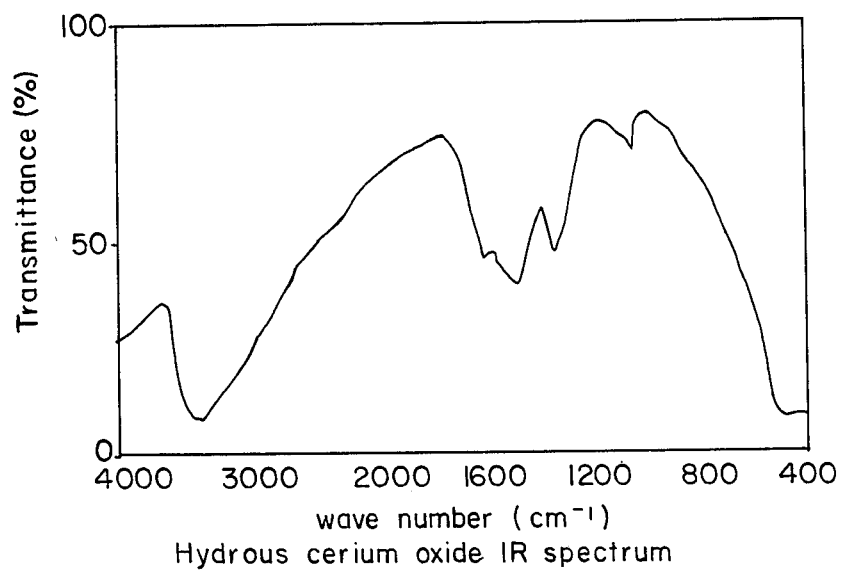
FIG. 3b is an infrared absorption spectrum of the hydrous cerium oxide of the present invention.

An example of the pH dependency of the capacity of absorbing fluoride ions of the hydrous cerium oxide of the present invention (thermal weight reduction: 15.2%, average particle size of primary particles: 0.08 μ, average particle size of agglomerated particles: 0.4 μ, X-ray diffraction: FIG. 3a, IR spectrum: FIG. 3b) is shown.

Hydrofluoric acid and hydrosilicofluoric acid were diluted with distilled water, respectively, to prepare fluoride ion containing water with respective fluoride ion concentrations of 2 mmol/liter (38 ppm), and each of said aqueous solutions was mixed with said adsorbent at a proportion of 1g-adsorbent/one liter, followed by stirring. Said mixture was adjusted to a predetermined pH with addition of 0.1N aqueous sodium hydroxide solution. After 2 hours, the concentration of fluoride ions dissolved in the mixture was measured by ion chromatography (device: Model 20201, produced by Dionex Co.). The result is shown in FIG. 1 as the relationship between the pH of the solution and the percentage of fluoride ions removed.

As reference examples, the results of the same experiments conducted for chloride ions, nitrate ions and sulfate ions are shown in FIG. 1.

Preparation of Hydrous Cerium Oxide

Cerium chloride was dissolved in distilled water and an aqueous hydrogen peroxide in amount equivalent to cerium was added to the solution, followed by stirring. Then, the mixture was adjusted to pH 9 with addition of ammonia water. Thereafter, excessive hydrogen peroxide was decomposed by heating the mixture at 85° C., and then the mixture aged overnight. After filtration, the product was dried in an air bath at 50° C. for 2 days.

EXAMPLE 2-7

Examples of adsorption capacities of the adsorbents of the present invention for fluoride ions are shown.

Figure 4A:
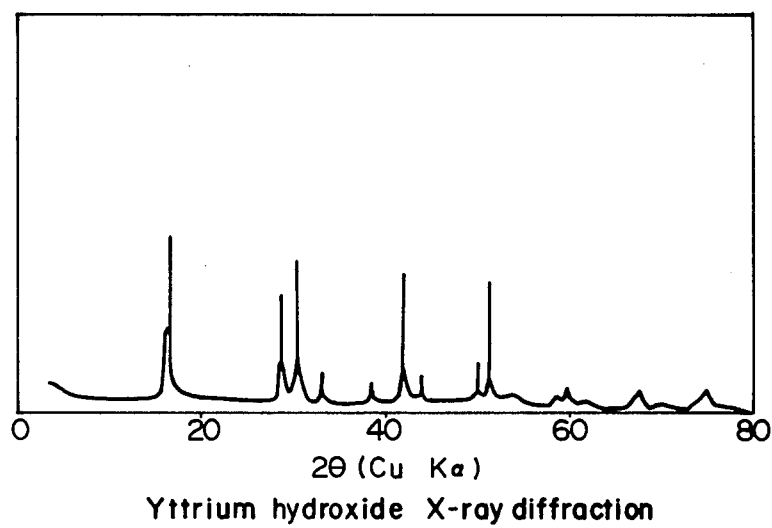
FIG. 4a is a X-ray diffraction spectrum of the yttrium hydroxide of the present invention.
Figure 4B:
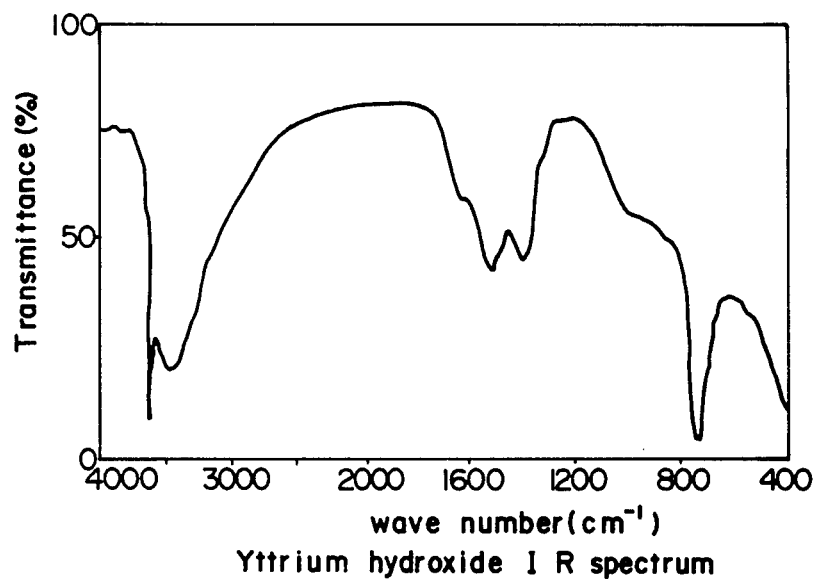
FIG. 4b is an infrared absorption spectrum of the yttrium hydroxide of the present invention.
Figure 5A:
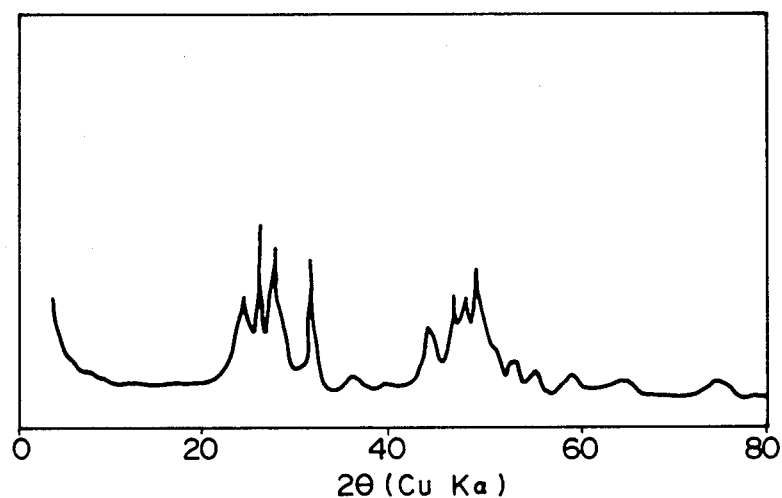
FIG. 5a is a X-ray diffraction spectrum of the hydrous yttrium fluoride of the present invention.
Figure 5B:
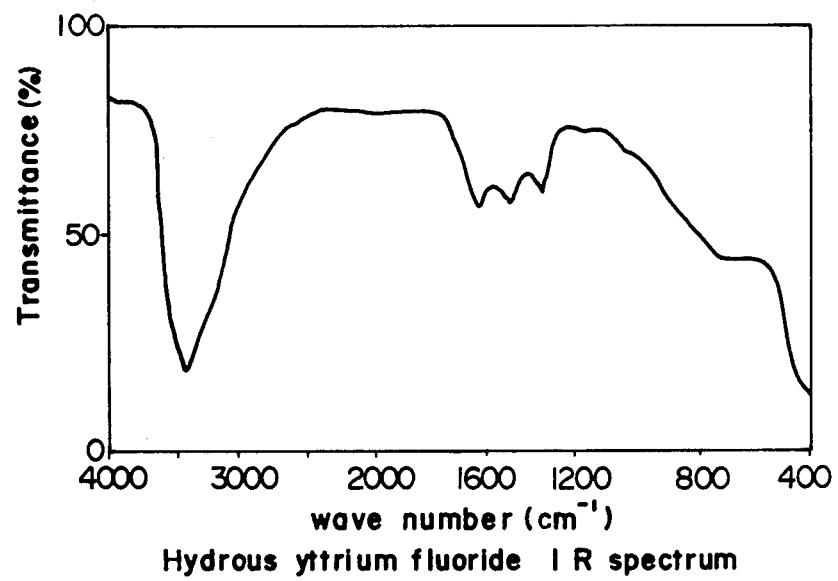
FIG. 5b is an infrared absorption spectrum of the hydrous yttrium fluoride of the present invention.

A fluoride ion containing water (2 mmol/liter, 38 ppm) was prepared similarly as in Example 1, and said aqueous solution was mixed with each of hydrous cerium oxide (the same substance as in Example 1), yttrium hydroxide (prepared as described below, thermal weight reduction: 25%, average particle size of primary particles: 0.1 μ, average particle size of agglomerated particles: 1 μ, X-ray diffraction: FIG. 4a, IR absorption spectrum: FIG. 4b), hydrous yttrium fluoride (prepared as described below, thermal weight reduction: 25%, average particle size of primary particles: 0.03 u, average particle size of agglomerated particles: 1 u, X-ray diffraction: FIG. 5a, IR absorption spectrum: FIG. 5b), hydrous rare earth chlorides mixture (prepared as described below, thermal weight reduction: 18%, average particle size of primary paticles: 0.05 μ, average particle size of agglomerated particles: 1 μ), acidic hydrous cerium phosphate (prepared as described below, thermal weight reduction: 22%, average particle size of primary particles: 0.12 μ, average particle size of agglomerated particles: 2 μ) and hydrous cerium pyrophosphate (prepared as described below, thermal weight reduction: 17%, average particle size of primary particles: 0.15 u, average particle size of agglomerated particles: 2 u) at proportions of one liter/1g-adsorbent and 3 liters/g-adsorbent, respectively, followed by stirring. To each of the mixtures, 0.1N aqueous sodium hydroxide solution or 0.1N hydrochloric acid was added to adjust the pH to 5. After 2 hours, the concentration of the fluoride ions dissolved in said solution was measured according to the same method as in Example 1, and the percentage of fluoride ions removed and the amount of adsorption were calcualted therefrom. The results are shown in Table 1.

For comparative purpose, the same experiments as in Examples 2-7 were also conducted for activated alumina (commercial product, fillers for gas chromatography) and hydrous titanium hydroxide (commercial product). The results are also shown in Table 1.

TABLE 1

| | | Mixing ratio | | | |
|---|---|---|---|---|---|
| | | 1 l/g-adsorbent | | 3 l/g-adsorbent | |
| | Adsorbent | Removal percentage (%) | Adsorbed amount (mmol/g) | Removal percentage (%) | Adsorbed amount (mmol/g) |
| Example 2 | Hydrous cerium oxide | 98 | 1.96 | 58 | 3.47 |
| Example 3 | yttrium hydroxide | 93 | 1.86 | 73 | 4.35 |
| Example 4 | Hydrous yttrium fluoride | 98 | 1.96 | 63 | 3.77 |
| Example 5 | Hydrous rare earth chlorides mixture | 96 | 1.92 | 60 | 3.60 |
| Example 6 | Acidic hydrous cerium phosphate | 74 | 1.48 | 35 | 2.10 |
| Example 7 | Hydrous cerium pyrophosphate | 49 | 0.98 | 20 | 1.21 |
| Comparative example 1 | Activated alumina | 43 | 0.85 | 16 | 0.94 |
| Comparative example 2 | Hydrous titanium oxide | 35 | 0.70 | 14 | 0.82 |

Method for Preparation of Adsorbent 1

Yttrium hydroxide: Yttrium chloride was dissolved in distilled water and an aqueous sodium hydroxide was added to adjust the resultant solution to pH 9. After aging overnight, the product was thoroughly washed with distilled water and dried at 110° C.

Method for Preparation of Adsorbent 2

Hydrous yttrium fluoride: Yttrium chloride was dissolved in distilled water and the resultant solution was adjusted with ammonia water to pH 9. To the precipitates formed were added hydrofluoric acid in an amount of 3-fold equivalents or more of yttrium. After aging overnight, the precipitates were thoroughly washed with distilled water, filtered and dried at 60° C. One gram of said precipitates was suspended in 100 cc of 0.1N aqueous sodium hydroxide, washed with water, filtered and dried at 60° C.

Method for Preparation of Adsorbent 3

Hydrous rare earth oxides mixture: Rare earth chlorides mixture were dissolved in distilled with water and stirred with addition of aqueous hydrogen peroxide in an amount equivalent to rare earth, followed by adjustment to pH 9 with addition of ammonia water. Then, excessive hydrogen peroxide was decomposed by heating the mixture at 85° C. and, after cooling, the mixture was adjusted to pH 4 with addition of hydrocholoric acid. After aging overnight, the product was washed thoroughly with distilled water and dried at 60° C.

The composition of Y, La and lanthanides in said rare earth chlorides mixture is shown in Table 2.

TABLE 2

| (Composition of rare earth chlorides: calc'd on oxides) | |
|---|---|
| $La_2O_3$ | 25.15 wt. % |
| $Ce_2O_4$ | 51.91 wt. % |
| $Pr_6O_{11}$ | 5.12 wt. % |
| $Nd_2O_3$ | 16.07 wt. % |
| $Sm_2O_3$ | 1.02 wt. % |
| $Eu_2O_3$ | 0.19 wt. % |
| $Gd_2O_3$ | 0.17 wt. % |
| $Y_2O_3$ | 0.04 wt. % |

Method for Preparation of Adsorbent 4

Acidic hydrous cerium phosphate: An aqueous ceric nitrate solution was added to an aqueous nitric acidic solution of disodium hydrogen phosphate. The gel precipitates were washed by decantation for several times, and immersed in 1N aqueous sodium hydroxide solution for 2 hours, washed with water and dried at 100° C.

Method for Preparation of Adsorbent 5

Hydrous cerium pyrophosphate: To an aqueous cerous chloride was added an aqueous sodium pyrophosphate, and the mixture was aged overnight. The precipitates were thoroughly washed with distilled water, then immersed in 1N aqueous sodium hydroxide and washed with water, followed by drying at 100° C.

EXAMPLE 8-10

Examples of ion selectivity of the adsorbents of the present invention are shown.

An aqueous mixed acid was prepared by diluting hydrofluoric acid, hydrochloric acid, nitric acid and sulfuric acid to each 2 mmol/liter concentration of fluoride ions, chloride ions, nitrate ions and sulfate ions. Said aqueous mixed acid was mixed with each 1g-adsorbent/one liter of hydrous cerium oxide (the same substance as in Example 1), yttrium hydroxide (the same substance as in Example 3) and hydrous yttrium fluoride (the same substance as in Example 4), respectively, followed by stirring. To said mixture was added an aqueous 0.1N sodium hydroxide to adjust the mixture to pH 5. After two hours, the concentrations of fluoride ions, chloride ions, nitrate ions and sulfate ions in said solution were measured according to the same method as in Example 1 to determine the amounts of respective ions adsorbed on respective adsorbents.

From the results of measurements, the coefficients of selectivity of respective adsorbents for fluoride ions relative to chloride ions, nitrate ions and sulfate ions were calculated from the formula (I). The results of measurements and the amounts adsorbed are shown in Table 3a, and the coefficients of selectivity in Table 3b.

TABLE 3a

| | | F | | Cl | | $NO_3$ | | $SO_4$ | |
|---|---|---|---|---|---|---|---|---|---|
| | Adsorbent | L*1 | S*2 | L | S | L | S | L | S |
| Example 8 | Hydrous cerium oxide | 0.27 | 1.73 | 1.94 | 0.06 | 1.97 | 0.03 | 1.66 | 0.34 |
| Example 9 | Yttrium hydroxide | 0.44 | 1.56 | 1.94 | 0.06 | 1.97 | 0.03 | 1.92 | 0.08 |
| Example 10 | Hydrous yttrium fluoride | 0.11 | 1.89 | 1.92 | 0.08 | 1.99 | 0.01 | 1.72 | 0.28 |

*1 L = liquid; fluoride ion conc. in sample water (mmol/liter)
*2 S = solid; adsorbed amount (mmol/g-adsorbent)

TABLE 3b

| | (Selectivity coefficient) | | |
|---|---|---|---|
| | F/Cl | $F/NO_3$ | $F/SO_4$ |
| Example 8 | 207 | 421 | 31 |
| Example 9 | 115 | 233 | 85 |
| Example 10 | 421 | 3420 | 106 |

EXAMPLE 11

Examples of the pH dependency of desorption percentage in the desorbing regeneration operation of the adsorbent of the present invention with an aqueous alkaline solution is shown.

The hydrous yttrium fluoride adsorbed previously with 5.4 mmol/g-adsorbent of fluoride ions was mixed with 0.01 to 1.0N aqueous sodium hydroxide solutions, respectively, at a proportion of 10 g-adsorbent/liter, stirred, and, after 2 hours, the pH and the ion concentration of the mixture were measured (according to the same method as in Example 1). The results are shown in Table 4 and FIG. 2.

TABLE 4

| | NaOH conc. (N) | pH of mixture | Desorption percentage (%) |
|---|---|---|---|
| Example 11-a | 0.01 | 10.10 | 16.7 |

TABLE 4-continued

| | NaOH conc. (N) | pH of mixture | Desorption percentage (%) |
|---|---|---|---|
| Example 11-b | 0.05 | 12.37 | 55.0 |
| Example 11-c | 0.10 | 12.85 | 66.6 |
| Example 11-d | 0.50 | 13.55 | 90.2 |
| Example 11-e | 1.0 | 13.83 | 100 |

EXAMPLE 12-14

Examples of the desorbing regeneration operations by use of various aklali species in the desorbing regeneration operations of the adsorbents of the invention are shown.

The hydrous yttrium fluoride adsorbed previously with 5.4 mmol/g-adsorbent of fluoride ions was mixed with 0.5N aqueous sodium hydroxide, aqueous potassium hydroxide and ammonia water, respectively, at a proportion of 10 g-adsorbent/liter, stirred, and, after 2 hours, the pH and the ion concentration of the mixture were measured (according to the same method as in Example 1). The results are shown in Table 5.

TABLE 5

| | Alkali species | pH | Desorption percentage (%) |
|---|---|---|---|
| Example 12 | NaOH | 13.55 | 90.2 |
| Example 13 | KOH | 13.50 | 85.0 |
| Example 14 | $NH_4OH$ | 12.20 | 50.0 |

EXAMPLE 15-17

Examples of capacities for adsorption of fluoride complex ions of the adsorbents of the present invention are shown.

An aqueous solution with the total fluorine concentration of 100 ppm comprising fluoride complex ions in aqueous solution was prepared. As the fluoride complex ions, sodium silicofluoride (reagent, special grade), titanium potassium fluoride (reagent) or cryolite (reagent) was employed. Said mixed aqueous solution was mixed with hydrous cerium oxide (the same substance as in Example 1) at a proportion of 1g-adsorbent/liter and adjusted to pH 5, followed by stirring for 24 hours.

The respective ions in the aqueous solution were measured to measure the residual fluorine concentrations in water and determine the removal percentages of fluorine. The results are shown in Table 6.

TABLE 6

| | Complex fluoro anion | Amount of fluorine adsorbed (mg-F/g-adsorbent) | Total fluorine removal percentage (%) |
|---|---|---|---|
| Example 15 | Hexafluorosilicic | 83 | 83 |
| Example 16 | Hexaluoroaluminum | 91 | 91 |
| Example 17 | Hexafluorotitanium | 85 | 85 |

EXAMPLE 18

An example of the pH dependency of desorption percentage in the desorbing regeneration operation of the adsorbent of the present invention with an aqueous alkaline solution is shown.

The hydrous yttrium fluoride adsorbed previously with 0.82 mmol/g-adsorbent of hexafluorosilicic ions was mixed with 0.01 to 1.0N aqueous sodium hydroxide solutions, respectively, at a proportion of 10 g-adsorbent/liter, stirred, and, after 2 hours, the pH and the ion concentration of the mixture were measured (according to the same method as in Example 1). The results are shown in Table 7.

TABLE 7

| | NaOH conc. (N) | pH of mixture | Desorption percentage (%) |
|---|---|---|---|
| Example 18-a | 0.01 | 10.34 | 23 |
| Example 18-b | 0.05 | 12.46 | 59 |
| Example 18-c | 0.10 | 12.88 | 74 |
| Example 18-d | 0.50 | 13.53 | 93 |
| Example 18-e | 1.0 | 13.86 | 100 |

EXAMPLE 19

An example of adsorption and desorption operations performed by use of the bead-like adsorbent comprising particulate hydrous cerium oxide carried on a polyacrylonitrile resin is shown.

A fluoride ion containing water with a fluoride ion concentration of 10 mmol/liter was prepared by diluting hydrofluoric acid with distilled water. One liter of said solution was mixed and stirred with 7.0 cc as bulk volume of said adsorbent (bead size 1.0–0.5 mm$\phi$, void volume ratio: 0.65). To the mixed solution, an aqueous sodium hydroxide was added to adjust pH to 5. After 5 hours, the fluoride ion concentration in said mixed solution was measured according to the same method as in Example 1, and the amount adsorbed was calculated therefrom. The results are shown in Table 8.

Subsequently, 20 cc (as bulk volume) of the above adsorbent after adsorption were filled in a glass column of 10 mm$\phi$, and an aqueous 0.1N sodium hydroxide was passed therethrough at the rate of 40 cc/hour for 8 hours. The effluent from the column was recovered in fractions every 30 minutes and the fluoride ion concentration in said effluent was measured according to the same method as in Example 1. From the results of measurement, the total amount desorbed and the desorption were calculated to obtain the values as shown in Table 8.

TABLE 8

| Adsorption | | | Desorption | |
|---|---|---|---|---|
| F conc. (mmol/l) | Fluorine removal percentage (%) | Adsorbed amount (mmol/g-adsorbent) | Total desorbed amount (mmol) | Desorption percentage (%) |
| 1.90 | 81.0 | 3.90 | 22.5 | 97.0 |

Method for Preparation of the Adsorbent

A polyacrylonitrile was dissolved in 10 wt. % of dimethylformamide, and hydrous cerium hydroxide (the same substance as in Example 1) was added in an amount of 4-fold of the weight of the polymer, followed by thorough stirring, to be dispersed therein. Said mixture was formed into porous beads by use of water as the coagulation bath.

EXAMPLE 20

A fluorine adsorbent having hydrous cerium oxide carried on a matrix of an ethylene-vinyl alcohol copolymer containing 38 mole % of ethylene at a proportion of 0.3 g/ml-adsorbent was prepared, and an example of fluorine adsorption operation by us thereof is explained below.

A column of 10 mmφ diameter was filled with 15 ml of the above adsorbent, and solutions containing hydrofluoric acid at 100 mg/liter as fluorine, adjusted to various pH's with aqueous sodium hydroxide, were passed through the column, respectively, under the conditions of 20° C. and a space velocity of 10 hr$^{-1}$. The amount of the solutions passed per 1 ml of the adsorbent until the fluorine concentration in the treated water became 1 ppm were determined to obtain the results as shown in Table 9.

TABLE 9

| | pH of solution | Amount of water treated (ml-eluate/ml-adsorbent) |
|---|---|---|
| Example 20-a | 3 | 250 |
| Example 20-b | 4 | 200 |
| Example 20-c | 5 | 100 |
| Example 20-d | 6 | 40 |

Next, subsequent to the adsorption operation of Example 18-a, an aqueous sodium hydroxide of 240 mmol/liter was passed under the condition of a space velocity of 3 hr$^{-1}$ to desorb fluoride ions adsorbed. As the result, the total fluorine concentration in the desorbed solution was as high as 3500 ppm, with the desorption percentage being 100%. The amount of the alkali necessity for desorption was found to be 1.3-fold in terms of the equivalent ratio relative to fluorine.

Method for preparation of adsorbent

An ethylene-vinyl alcohol copolymer (ethylene: 38 mole %) was dissolved in dimethyl sulfoxide at a concentration of 11 wt. %, and hydrous cerium oxide (the same substance as in Example 1) was added in an amount of 4-fold of the weight of the polymer, followed by thorough stirring, to be dispersed therein to form a slurry. Said slurry was formed into porous beads by use of water as the coagulation bath.

EXAMPLES 21–22

Examples of precipitation separation by addition of calcium ions with the use of the eluate with pH 6.7 and a fluoride concentration of 3500 ppm obtained by the column desorption method in Example 20 are shown.

Precipitation separation of fluorine was performed by adding various amounts of calcium chloride or calcium hydroxide and stirring the mixture at 20° C. for 30 minutes. The results are shown in Table 10.

TABLE 10

| | Calcium compound added | Amount of $Ca^{2+}$ added/ $F^-$ equivalent ratio | Residual fluorine conc. in filtrate (mg/liter) |
|---|---|---|---|
| Example 21a | Calcium chloride | 1 | 46 |
| Example 21b | Calcium chloride | 2 | 19 |
| Example 21c | Calcium chloride | 3 | 13 |
| Example 21d | Calcium chloride | 5 | 12 |
| Example 21e | Calcium chloride | 10 | 12 |
| Example 22a | Calcium hydroxide | 2 | 19 |
| Example 22b | Calcium hydroxide | 3 | 18 |

EXAMPLE 23

Examples of recovery of alkali solutions performed with the use of the eluate with pH 6.7 and a fluoride concentration of 3500 ppm obtained by the column desorption method in Example 20° are shown.

The compositions of the alkali solutions recovered by adding various amounts of calcium hydroxide and stirring the mixture at 20° C. for 30 minutes were measured. The results are shown in Table 11.

TABLE 11

| | Ca added $Ca^{2+}/F^-$ equivalent ratio | Alkaline solution recovered | | |
|---|---|---|---|---|
| | | pH | $[OH^-]$ mmol/l | $[F^-]$ mmol/l | $[Ca^{2+}]$ mmol/l |
| Example 23a | 2 | 12.1 | 11 | 1.6 | 2.1 |
| Example 23b | 2 | 13.2 | 123 | 1.0 | 3.7 |
| Example 23c | 2 | 13.8 | 621 | 0.9 | 3.5 |
| Example 23d | 3 | 13.2 | 121 | 1.0 | 4.2 |
| Example 23e | 5 | 13.3 | 133 | 1.0 | 5.3 |

EXAMPLE 24

An adsorbent having hydrous yttrium fluoride (the same substance as in Example 4) carried on a matrix of polyacrylonitrile at a proportion of 0.3 g/ml-adsorbent was prepared, and fluorine adsorption, regeneration operation, precipitation separation of fluorine in eluate and recovery of alkali solution were performed by use thereof as shown below.

A column of 10 mm φ diameter was filled with 15 ml of the above adsorbent, and a starting solution containing sodium fluoride at 100 ppm as fluoride ions and adjusted to pH 3 was passed through the column under the condition of a space velocity of 30 hr$^{-1}$. As the result, the amount of the treated solution until the fluoride ion concentration in the treated water at the column outlet became 1 ppm was found to be 120-fold per 1 ml of the adsorbent, and the amount of fluorine adsorbed was 12 mg/ml-adsorbent.

Next, the above adsorbent having fluorine adsorbed thereon was subjected to desorbing regeneration by use of the alkali solution which was recovered as described below. The alkali solution contained 130 mmol/liter of hydroxide ions, 0.1 mmol of calcium ions and 1 mmol/liter of fluoride ions. As the result of passage of said recovered alkali solution in an amount of 6.7-fold volume of the adsorbent volume under the conditions of a space velocity of 2 hr$^{-1}$, the eluate obtained contained sodium fluoride as the main component at an average fluoride ion concentration of 95 mmol/liter at pH 6.8, with desorption percentage of fluorine being 100%.

For recovery of the alkali solution from said eluate, 47.5 mmol/liter ($Ca^{2+}/F^-=2$ equivalent ratio) of calcium hydroxide was added and the mixture wa stirred at 20° C. for 30 minutes. As the result, the fluoride ions of sodium fluoride in the eluate were precipitated as calcium fluoride, and sodium was recovered as sodium hydroxide. The alkali solution recovered had a composition of 130 mmol/liter of sodium hydroxide, 3.7 mmol/liter of calcium ions and 1 mmol/liter of fluoride ions.

Next, by passing the above alkali solution through the column of 10 mm φ diameter filled with 10 ml of the same adsorbent as used in fluoride adsorption under the condition of a space velocity of 30 hr$^{-1}$, an alkali solution with a calcium ion concentration of 0.1 mmol/liter was obtained in an amount of 80-fold of the volume of the adsorbent to be recovered as the alkali solution for desorbing regeneration of the adsorbent after fluorine adsorption. The concentrations of sodium hydroxide and fluorine were not changed by this operation.

As described above, the adsorbent of the present invention has great capacity for adsorption of fluorine and fluorine compounds, and besides its selectivity is also high. Further, the adsorbent having fluorine adsorbed thereon can readily be subjected to desorption of fluoride ions by contact with an aqueous alkali solution to be used repeatedly, and therefore it can be used suitably as the method for separating efficiently and economically fluorine from water containing a minute amount of fluorine dissolved therein.

Also, in the treating method of the present invention, fluorine compounds can be separated from the highly concentrated fluorine containing liquor formed in the regeneration step of the adsorbent and its filtrate can be used for recyle as the regenerating liquor of the adsorbent, and therefore it is a closed fluorine treating process, being extremely efficient and highly economical substantially without use of a regenerating chemical for the adsorbent.

What we claim is:

1. A process for separating dissolved fluorine or fluorine compounds, which comprises:
   bringing a solution having a pH ranging from 2 to 5 and containing fluorine or fluorine compounds dissolved thereinto into contact with a hydrated rare earth oxide or insoluble hydrated rate earth salt as an adsorbent.

2. The process according to claim 1, wherein the rare earth element is at least one selected from Sc, Y, La, Ce, Pr, Nd, Pm, Sm, Eu, Gd, Tb, Dy, Ho, Er, Tm, Yb and Lu.

3. The process according to claim 1, wherein the adsorbent is hydrous cerium oxide.

4. The process according to claim 1, wherein the adsorbent is a hydrous rare earth oxide obtained from a starting material of a mixture of rare earth chlorides.

5. The process according to claim 1, wherein the adsorbent further comprises:
   40 mol % or less of a coexisting metal based on a metal element of the adsorbent, said coexisting metal selected from the group consisting of Al, Cr, Co, Ga, Fe, Mn, Ni, Ti, V, Sn, Zr, Hf, Ge, Nb, Ta and Th; or
   coexisting cations and anions selected from the group consisting of $NH_4$, Na, K, Ca, Mg, Al, $SO_4$, $NO_3$, F, Cl, $PO_4$, $P_2O_7$, $CrO_4$, $BO_3$, $SiO_3$ and $CO_3$.

6. The process according to claim 1, wherein said solution further comprises ions selected from the group consisting of chloride ions, nitrate ions, sulphate ions and combinations thereof and wherein the fluorine compounds are selectively separated from the solution.

7. A process for separating dissolved fluorine or fluorine compounds, which comprises:
   bringing a solution having a pH ranging from 2 to 5 and containing fluorine or fluorine compounds dissolved therein into contact with an hydrated rare earth oxide or an insoluble hydrated rare earth salt as an adsorbent which is carried on a porous organic polymeric material selected from the group consisting of polyamide, cellulose resin, polysulfone, polyacrylonitrile and ethylene-vinyl alcohol copolymer.

8. The process according to claim 7 wherein the form of porous material is spherical.

9. The process according to claim 8, wherein the porous material has a porosity of 0.5 to 0.85 and bead size of 0.1 to 5 mm.

10. The process according to claim 7, wherein the amount of polymer is 5 to 50 wt % of said hydrated rare earth salt.

11. The process according to claim 7, wherein the hydrated rare earth salt is selected from the group consisting of a hydrous rare earth fluoride and a hydrous rare earth phosphate.

12. A process for treating dissolved fluorine, which comprises:
    bringing an aqueous solution of pH 2 to 5 containing fluorine or fluorine compounds dissolved therein into contact with an adsorbent comprising hydrated rare earth oxides or insoluble hydrated rare earth salts to seperate fluorine or fluorine compounds by adsorption, and
    bringing said adsorbent having adsorbed fluorine or fluorine compounds thereon into contact with an alkali solution of pH 10 to 14 to desorb the adsorbed fluorine or fluorine compounds, thereby regenerating said absorbent.

13. The process according to claim 12, further comprising the step of separating fluorine or fluorine compounds by addition of a precipitating agent for fluorine or fluorine compounds to the alkali solution containing the desorded fluorine or fluorine compounds.

14. The process according to claim 13, further comprising the step of recovering the alkali solution as a regenerating solution of the absorbent having a adsorbed fluorine or fluorine compounds thereon.

15. The process according to claim 12, wherein the alkali solution contains at least one alkali selected from the group consisting of sodium hydroxide, potassium hydroxide, ammonium hydroxide and organic amines.

16. The process according to claim 13, wherein the precipitating agent for fluorine is at least one compound selected from the group consisting of salts, oxides and hydroxides of calcium, magnesium and aluminum.

17. The process according to claim 12, wherein the amount of alkali to desorb the fluorine or fluorine compounds is about one equivalent or more of the fluorine atoms.

18. A process for separating dissolved fluorine or fluorine compounds, which comprises:
    bringing a solution containing fluorine or fluorine compounds dissolved therein into contact with an insoluble hydrated rare earth salt selected from the group consisting of a hydrous rare earth fluoride and a hydrous rare earth phosphate as an adsorbent.

19. The process according to claim 18, wherein the adsorbent is hydrous cerium fluoride.

20. The process according to claim 18, wherein the adsorbent is hydrous yttrium fluoride.

21. The process according to claim 18, wherein the adsorbent is hydrous lanthanum fluoride.

22. The process according to claim 18, wherein the adsorbent is a hydrous rare earth fluoride or a hydrous rare earth phosphate obtained from a starting material of a mixture of rare earth chlorides.

23. The process according to claim 22, wherein the adsorbent is hydrous cerium phosphate.

24. The process according to claim 18, wherein the insoluble hydrated rare eath salt has a solublity of 10 mg/liter or less in pure water.

25. A process for separating dissolved silicofluoride, which comprises bringing a solution having a pH ranging from 2 to 7 and containing silicofluoride dissolved therein into contact with a hydrated rare earth oxide as an absorbent.

26. A process for treating dissolved fluorine, which comprises:
brining an aqueous solution of pH 2 to 7 containing silicofluoride dissolved therein into contact with an absorbent comprising hydrated rare earth oxides to separate silicofluoride by adsorption, and
bringing said adsorbent having adsorbed silicofluoride thereon into contact with an alkali solution of pH 10 to 14 to desorb the absorbed silicofluoride, thereby regenerating said adsorbent.

* * * * *